(12) United States Patent
Kim et al.

(10) Patent No.: US 10,492,043 B1
(45) Date of Patent: Nov. 26, 2019

(54) APPARATUS AND METHOD FOR PROVIDING IOT SERVICE BASED ON VEHICLE LOCATION

(71) Applicants: HYUNDAI MOTOR COMPANY, Seoul (KR); KIA MOTORS CORPORATION, Seoul (KR)

(72) Inventors: Joon Young Kim, Seongnam-si (KR); Ju Won Kim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/206,935

(22) Filed: Nov. 30, 2018

(30) Foreign Application Priority Data

Jul. 10, 2018 (KR) .......................... 10-2018-0079714

(51) Int. Cl.
*H04W 4/44* (2018.01)
*H04W 4/021* (2018.01)

(52) U.S. Cl.
CPC ............. *H04W 4/44* (2018.02); *H04W 4/021* (2013.01)

(58) Field of Classification Search
CPC ....................................................... H04W 4/44
USPC ....................................................... 455/456.1
See application file for complete search history.

(56) References Cited

U.S. PATENT DOCUMENTS 9,781,602 B1 * 10/2017 Girdhar .................. H04W 4/70

* cited by examiner

*Primary Examiner* — Joel Ajayi
(74) *Attorney, Agent, or Firm* — Morgan, Lewis & Bockius LLP

(57) ABSTRACT

Disclosed herein is a method of dynamically modifying a boundary region in provision of an Internet of Things (IoT) service according to entry into and exit from a predetermined boundary region based on vehicle location. A method of controlling a boundary based service provision system includes setting a boundary around a destination according to a predetermined criterion, acquiring an entry direction of a vehicle and an estimated time of arrival (ETA) and an actual time required in the entry direction upon sensing that the vehicle passes through the boundary toward the destination, and resetting the boundary in the entry direction when a difference between the ETA and the actual time required is equal to or greater than a predetermined value.

13 Claims, 8 Drawing Sheets

(a)

(b)

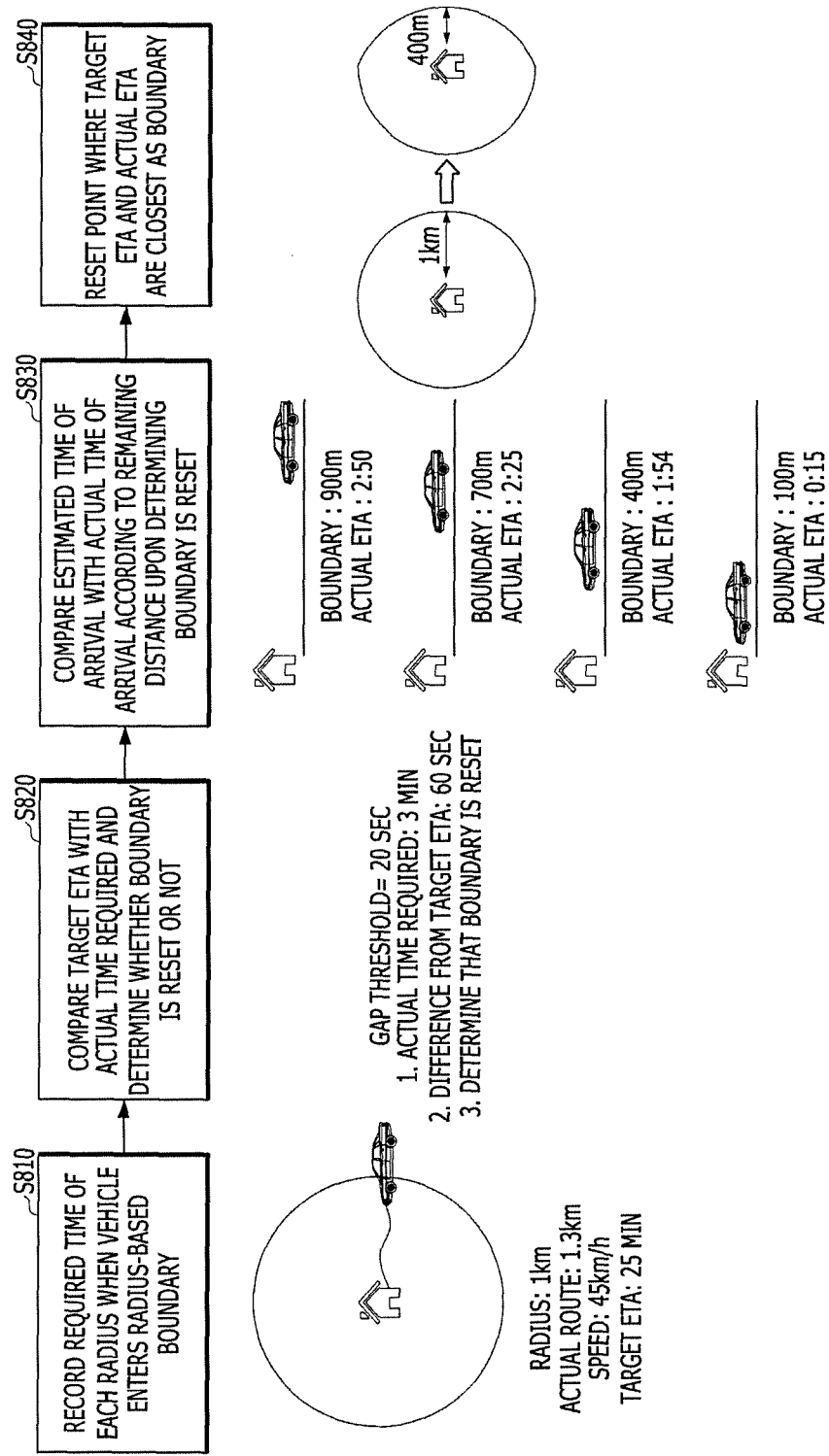

APPARATUS AND METHOD FOR PROVIDING IOT SERVICE BASED ON VEHICLE LOCATION

This application claims the benefit of Korean Patent Application No. 10-2018-0079714, filed on Jul. 10, 2018 in the Korean Intellectual Property Office, which is hereby incorporated by reference as if fully set forth herein.

TECHNICAL FIELD

The present disclosure relates to a method of dynamically modifying a boundary region in provision of an Internet of Things (IoT) service according to entry into and exit from a predetermined boundary region based on vehicle location.

BACKGROUND

Internet of Things (IoT) refers to a physical network capable of automatically exchanging data in real time between things each having a sensor and a communication chip without human intervention. In the IoT environment, devices (things) each having a sensor and a communication function are connected over the Internet to collect surrounding information, to exchange the surrounding information with other devices, and to make appropriate decisions.

That is, IoT means communication between things performing wired/wireless networking based on a sensor and a chip attached to an IoT device and is based on Bluetooth, near field communication (NFC), sensor data, a network, etc.

In particular, recently, IoT has been attracting attention because home appliances are controlled using a smartphone even out of doors, and application of IoT to vehicles has been actively attempted according to the concept of a smart car and a connected car.

As an example of such application, similarly to a geofence, a service for setting a boundary with respect to a specific point in advance, activating an IoT related service at a specific point when a vehicle enters the boundary from the outside and deactivating the IoT related service at a specific point when the vehicle leaves the boundary has been proposed. Such a service may be referred to as a welcome/goodbye service, which will be described with reference to FIG. 1.

FIG. 1 is a view illustrating the concept of a general welcome/goodbye service.

Referring to (a) of FIG. 1, when a vehicle 10 enters a boundary 30 set along the radius of a predetermined distance from a house 20, IoT devices 40 such as lighting devices or home appliances may be turned on. In contrast, as shown in (b) of FIG. 1, when the vehicle 10 leaves the boundary 30, the IoT devices 40 may be turned off. If such a service is provided, necessary functions (e.g., a cooking function, an air conditioning/heating function, etc.) may be activated in advance when the passenger of the vehicle 10 returns home and unnecessary functions may be automatically deactivated when the passenger of the vehicle 10 leaves home.

However, in the general welcome/goodbye service, since the boundary is set along the radius of the predetermined distance from a specific point and whether or not the service is performed is determined depending on whether or not the vehicle passes through the boundary, an arrival time difference or user preference for an individual device according to entry direction is not considered. For example, the direction of approach to the boundary may be changed depending on whether the user comes home from work or returns home after leisure activities. The user may habitually stop by in the boundary according to the direction of approach. In this case, even if time-sensitive services (e.g., cooking, cooling/heating, etc.) may be activated in advance, when the time of returning home is delayed due to stopover, service provision stability may be deteriorated and energy may be wasted.

SUMMARY

Accordingly, the present disclosure is directed to an apparatus and method for providing an IoT service based on vehicle location that substantially obviate one or more problems due to limitations and disadvantages of the related art.

An object of the present disclosure is to provide a method of providing a boundary based service in consideration of a return direction, and an apparatus for performing the same.

Another object of the present disclosure is to provide a method of providing a boundary based service, which is capable of resetting a boundary according to a return direction, and an apparatus for performing the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling a boundary based service provision system includes setting a boundary around a destination according to a predetermined criterion, acquiring an entry direction of a vehicle and an estimated time of arrival (ETA) and an actual time required in the entry direction upon sensing that the vehicle passes through the boundary toward the destination, and resetting the boundary in the entry direction when a difference between the ETA and the actual time required is equal to or greater than a predetermined value.

According to another aspect of the present disclosure, a boundary based service provision system includes a server configured to acquire at least location information of a vehicle, and a boundary resetting device configured to acquire an entry direction of the vehicle and an estimated time of arrival (ETA) and an actual time required in the entry direction upon sensing that the vehicle passes through a boundary predetermined around a destination based on a predetermined criterion, according to information received from the server, and to reset the boundary in the entry direction when a difference between the ETA and the actual time required is equal to or greater than a predetermined value.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 8 is a view showing a process of resetting a boundary according to an embodiment of the present disclosure.

DETAILED DESCRIPTION

Figure 1:
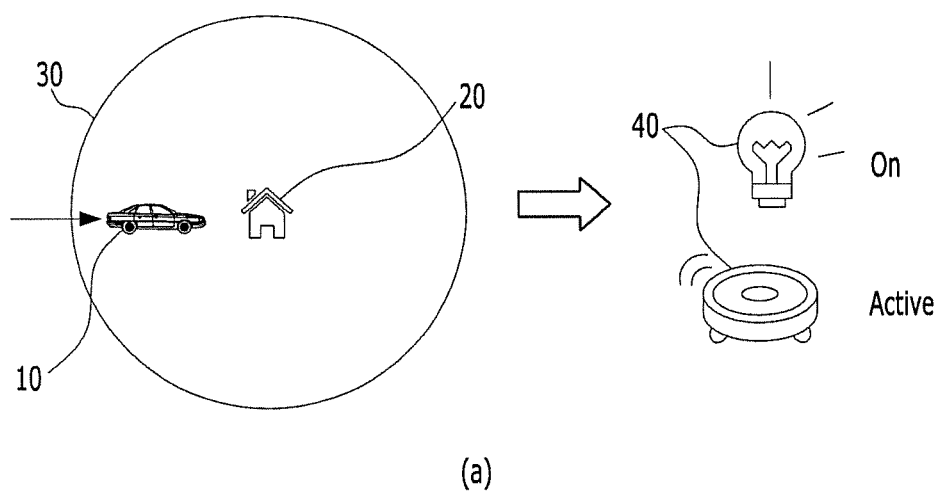
FIG. 1 is a view illustrating the concept of a general welcome/goodbye service.
Figure 1:
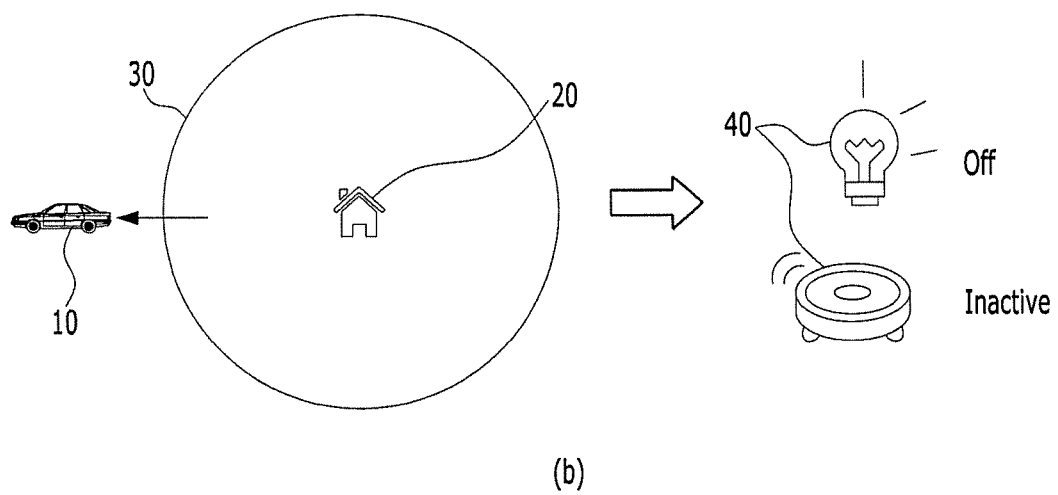

Hereinafter, the embodiments of the present disclosure will be described in detail with reference to the accompanying drawings. Like reference numerals in the drawings denote like elements, and thus their description will be omitted. The terms "unit", "-or/er" and "module" described in the specification indicate a unit for processing at least one function or operation, which may be implemented by hardware, software or a combination thereof. In describing the present disclosure, a detailed description of known functions and configurations will be omitted when it may obscure the subject matter of the present disclosure. The accompanying drawings are used to help easily understood the technical idea of the present disclosure and it should be understood that the idea of the present disclosure is not limited by the accompanying drawings. The idea of the present disclosure should be construed to extend to any alterations, equivalents and substitutions besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected to" another element, the element can be directly connected to the other element or intervening elements may also be present. In contrast, when an element is referred to as being "directly connected to" another element, there are no intervening elements present.

A singular representation may include a plural representation unless context clearly indicates otherwise.

In this specification, the term "have" or "include" signifies the presence of a specific feature, number, step, operation, component, part, or combinations thereof, not excluding the presence or addition of one or more other features, numbers, steps, operations, components, parts, or combinations thereof.

In one embodiment of the present disclosure, a boundary based service is set in consideration of a direction in which a vehicle enters or leaves a boundary, and the boundary is dynamically reset according to the direction in which the vehicle enters or leaves the boundary.

Figure 2:
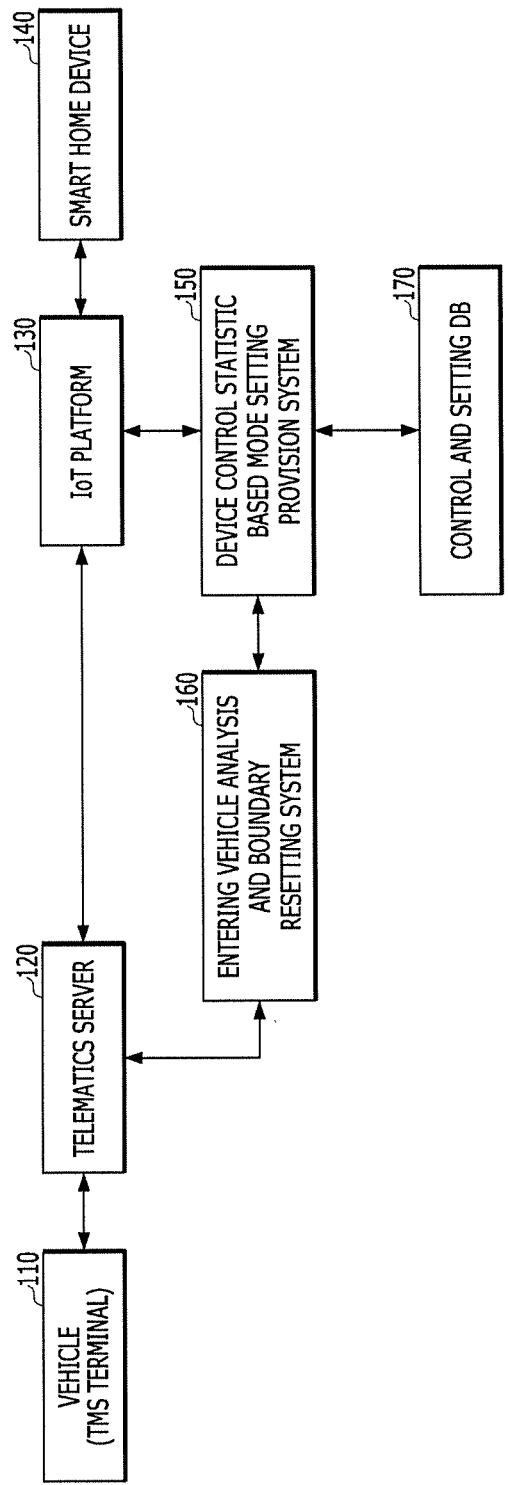
FIG. 2 is a block diagram showing an example of a configuration of a system applicable to embodiments of the present disclosure.

First, the configuration of a system applicable to the embodiments will be described with reference to FIG. 2. FIG. 2 is a block diagram showing an example of a configuration of a system applicable to embodiments of the present disclosure.

Referring to FIG. 2, a boundary-based IoT service provision system may include a vehicle 110, a telematics server 120, an IoT platform 130, a smart home device 140, a device control statistic based mode setting system 150 (or a mode setting device), an entering vehicle analysis and boundary resetting system 160 (or a boundary resetting device), and a control and setting database 170.

The vehicle 110 may include a telematics (TMS) terminal in order to perform wireless communication with the telematics server 120, and may transmit, to the telematics server, at least the position information thereof, a request for control of a specific smart home device or a request for activating/deactivating a specific control mode.

The telematics server 120 may receive a variety of information and requests from the vehicle 110 and transmit the information and request of the vehicle to the entering vehicle analysis and boundary resetting system 160 and the IoT platform 130.

The IoT platform 130 may control one or more smart home devices 140 and may be provided as a separate device or be mounted in a specific smart home device 140 serving as a hub according to implementation.

The smart home device 140 may change an operation state according to a command for controlling a specific device or mode control of the IoT platform, and may include a lighting device, an air conditioning/heating device, a cooking device, a cleaner, various opening/closing devices, etc., without being limited thereto.

The device control statistic based mode setting provision system 150 may collect a variety of information and generate or update a recommendation mode. A detailed function will be described below with reference to FIGS. 5 and 6.

The entering vehicle analysis and automatic boundary resetting system 160 may compare an estimated time of arrival with an actual time of arrival according to the boundary approach direction of the vehicle and reset the boundary according to the result of comparison. A detailed function thereof will be described below with reference to FIG. 4.

The control and setting database 170 may store a variety of information which may be referred to in the device control statistic based mode setting provision system 150 and the entering vehicle analysis and automatic boundary resetting system 160.

Figure 3:
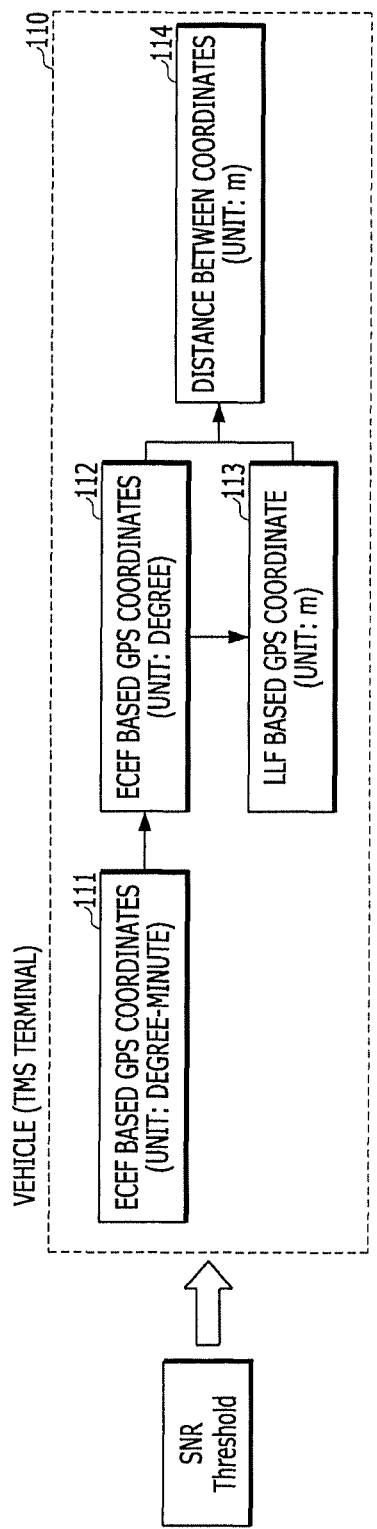
FIG. 3 is a view showing an example of a process of generating position information of a vehicle according to an embodiment of the present disclosure.

Next, a position information generation method of a vehicle will be described with reference to FIG. 3. FIG. 3 is a view showing an example of a process of generating position information of a vehicle according to an embodiment of the present disclosure.

Referring to FIG. 3, the GPS receiver of the vehicle 110 uses the latitude/longitude of the global positioning system fix data (GPGGA) as raw data NMEA0183. The latitude/longitude of the GPGGA may be output in the degree-minute (DM) format based on an earth centered inertial frame (ECEF). The latitude/longitude information may be immediately transmitted to the telematics server 120 and may be converted into a distance from a specific destination (e.g., home) through the following process.

Specifically, the ECEF based GPS coordinates 111 may be converted into a degree format 112 and a local level frame (LLF) format 113 for distance calculation. Accordingly, a distance 114 between two points, for example, the vehicle 110 and the specific destination (e.g., home), may be calculated using the latitude/longitude of the coordinates of the vehicle and the destination in the degree format and the LLF based distance.

In addition, the vehicle may additionally transmit, to the telematics server 120, velocity and entry direction data based on velocity and course degree in the GPS information.

Figure 4:
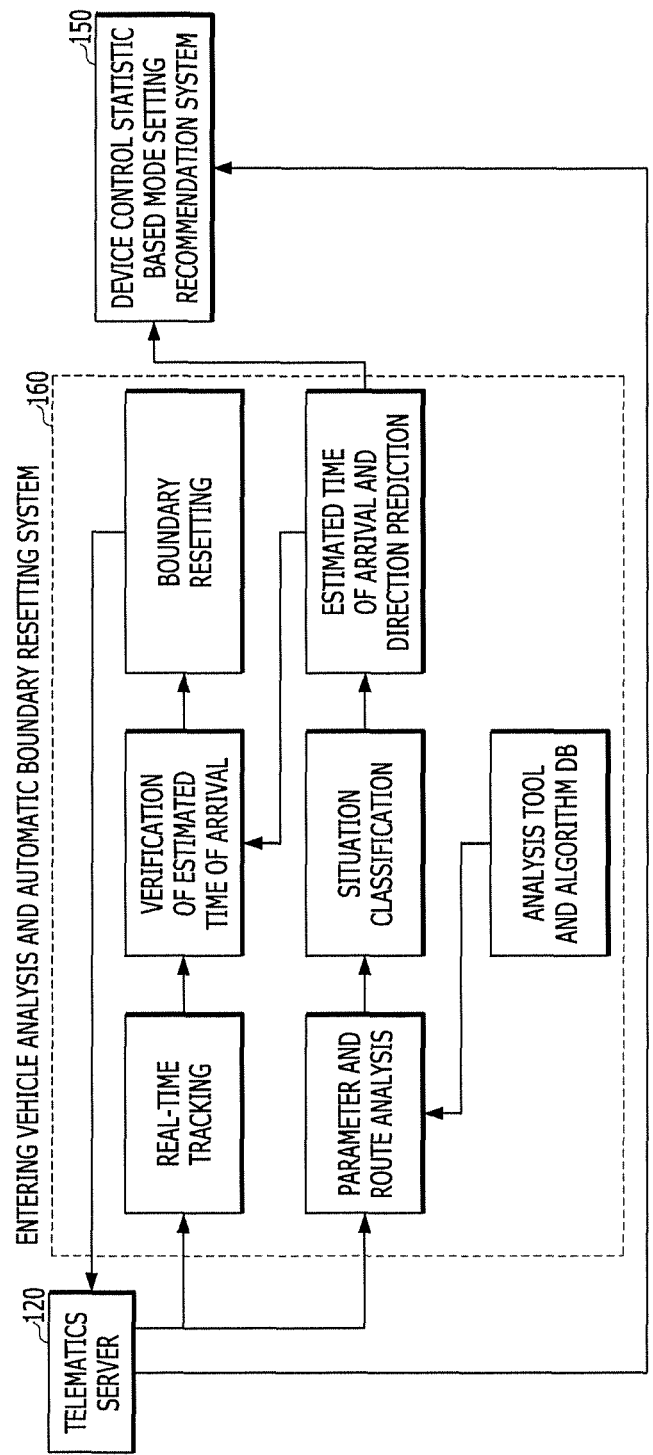
FIG. 4 is a view illustrating a configuration and operation of an entering vehicle analysis and automatic boundary resetting system according to an embodiment of the present disclosure.

Next, the configuration and operation of the entering vehicle analysis and automatic boundary resetting system 160 will be described with reference to FIG. 4. FIG. 4 is a view illustrating a configuration and operation of an entering vehicle analysis and automatic boundary resetting system according to an embodiment of the present disclosure.

Referring to FIG. 4, the entering vehicle analysis and automatic boundary resetting system 160 may perform verification of the estimated time of arrival and the actual time of arrival and boundary resetting according to the entry direction using the information related to the vehicle 110 received from the telematics server 120 and transmit the result to the device control statistic based mode setting recommendation system 150.

Specifically, the entering vehicle analysis and automatic boundary resetting system 160 tracks the position of the vehicle, a remaining distance to a destination, a speed, etc. in real time. In addition, the entering vehicle analysis and automatic boundary resetting system 160 may analyze the traveling related parameters and estimated route of the vehicle through information such as a distance to the destination, speed, and course degree of the vehicle, a road type, congestion or whether an accident occurs and classify the entry direction of the vehicle to the boundary and the purpose of coming home (coming home from work, leisure activity or emergency) through the result of analysis. According to the classified situations, the entering vehicle analysis and automatic boundary resetting system 160 predicts the entry direction of the vehicle to the boundary and the estimated time of arrival (ETA) and compares the ETA with the actual time of arrival according to real-time tracking to verify the ETA. According to the result of verification, the entering vehicle analysis and automatic boundary resetting system 160 may reset the boundary. Boundary resetting will be described below in detail with reference to FIG. 8.

Of course, the boundary resetting result may be transmitted to the telematics server 20 directly or through the device control statistic based mode setting recommendation system 150.

Figure 5:
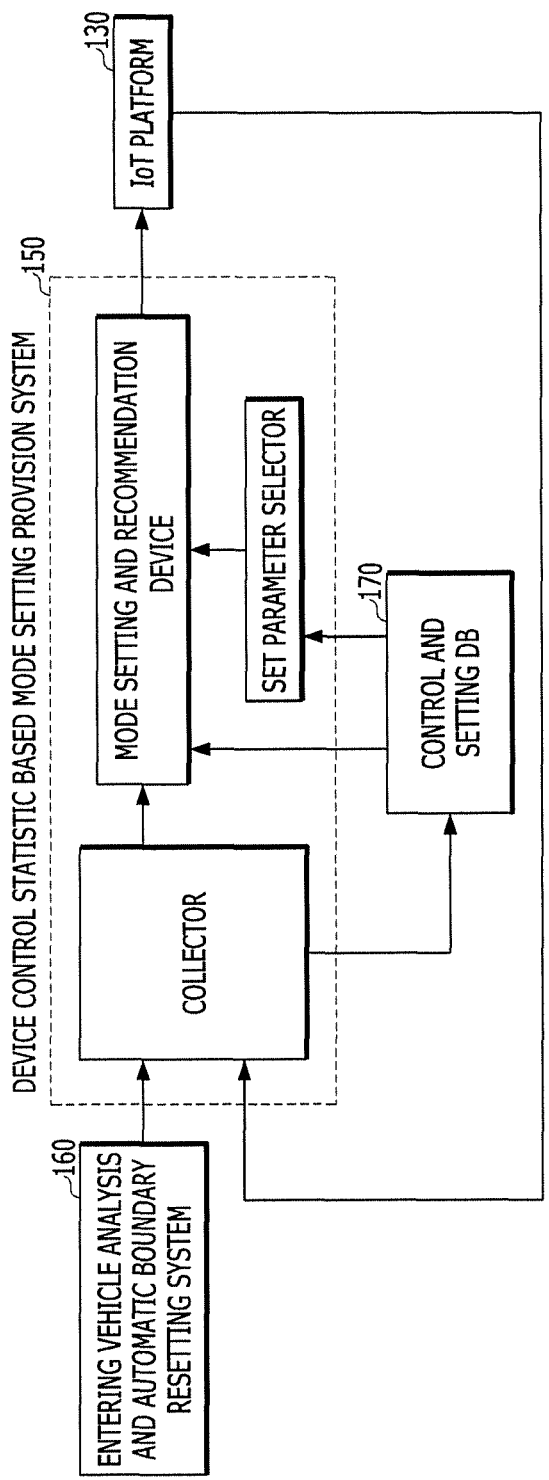
FIG. 5 is a view showing an example of a configuration of a device control statistic based mode setting recommendation system according to an embodiment of the present disclosure.
Figure 6:
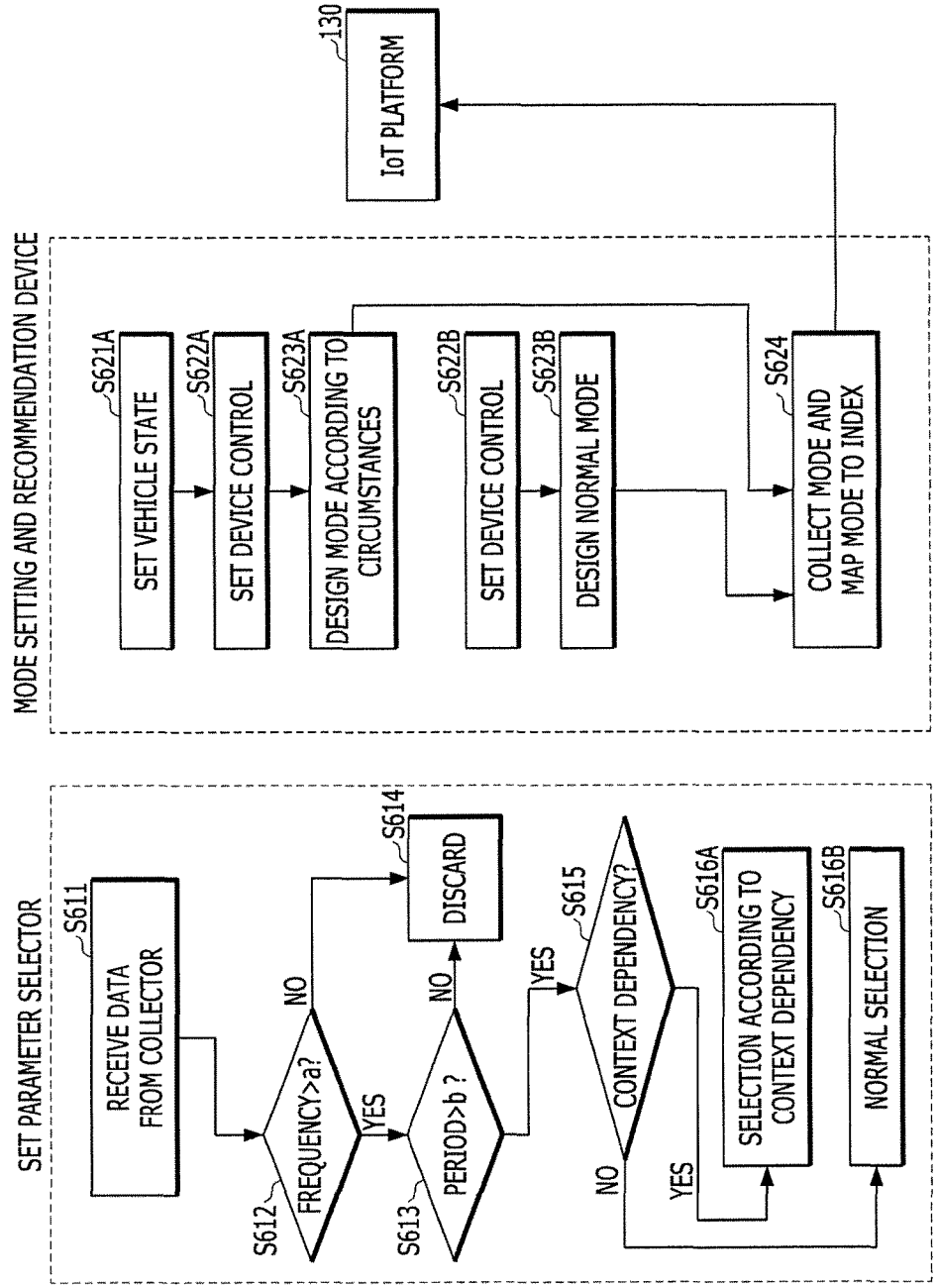
FIG. 6 is a view illustrating an example of operation of the device control statistic based mode setting recommendation system according to an embodiment of the present disclosure.

Next, the configuration and operation of the device control statistic based mode setting recommendation system 150 will be described with reference to FIGS. 5 and 6. FIG. 5 is a view showing an example of a configuration of a device control statistic based mode setting recommendation system according to an embodiment of the present disclosure, and FIG. 6 is a view illustrating an example of the operation of the device control statistic based mode setting recommendation system according to an embodiment of the present disclosure.

First, referring to FIG. 5, the device control statistic based mode setting recommendation system 150 may include a collector, a set parameter selector and a mode setting and recommendation device. The set parameter selector and the mode setting and recommendation device may refer to the control/setting database 170, and the collector may collect analysis/boundary information from the entering vehicle analysis and automatic boundary resetting system 160 and device control parameters and mode control feedback data from the IoT platform 130.

The set parameter selector may select a set value based on statistics and the mode setting and recommendation device may perform mode setting design and recommendation.

The detailed operation of the set parameter selector and the mode setting and recommendation unit will now be described with respect to FIG. 6.

Referring to FIG. 6, the set parameter selector first receives data from the collector (S611). The received data may include the frequency of usage of each mode, a usage period and information on which context dependency determination is based.

If the frequency of usage of an arbitrary mode is lower than a predetermined value a (no of S612) or if the usage period is lower than a predetermined value b (no of S613), the mode may be discarded (S614).

In addition, the set parameter selector may determine context dependency of each mode which is not discarded (S615), select a parameter corresponding to context dependency if context dependency is present (S616A) and, otherwise, select a normal parameter (S616B). A mode selected when the vehicle enters the boundary at a specific time in a specific direction may be regarded as having context dependency and a mode selected regardless of the entry direction or time may be regarded as having no context dependency.

The mode setting and recommendation device may design a mode according to circumstances (S623A) in consideration of the vehicle state (S621A) and device control setting (S622A) according to the parameter selected in the mode having context dependency. In contrast, in the mode having no context dependency, setting of the vehicle state may be omitted and the normal mode may be designed (S623B) in consideration of device control setting (S622B). One or more modes designed in the design processes S623A and S623B are collected and mapped to indices (S624) and the mode information and the index information may be transmitted to the IoT platform 130. At this time, each individual mode may have a form of grouping one or more smart home devices.

Through such a process, the mode information and the index may be acquired by the IoT platform 130 and may be transmitted to the vehicle 110 through the IoT platform 130 and the telematics server 120. Accordingly, the passenger of the vehicle 110 may select a desired mode by referring to the mode information and the vehicle 110 may transmit the index information corresponding to the selected mode to the IoT platform 130 through the telematics server 120 when the mode is selected. The IoT platform 130 may control the smart home device 140 connected thereto based on a time when the vehicle 110 passes through the boundary according to the mode corresponding to the received index.

The components described above with reference to FIGS. 3 to 5 focus on the functions thereof. It is apparent to those skilled in the art that the components except for the vehicle or the smart home device may be distributed in two or more different devices or one device may perform the functions of two or more components.

Figure 7:
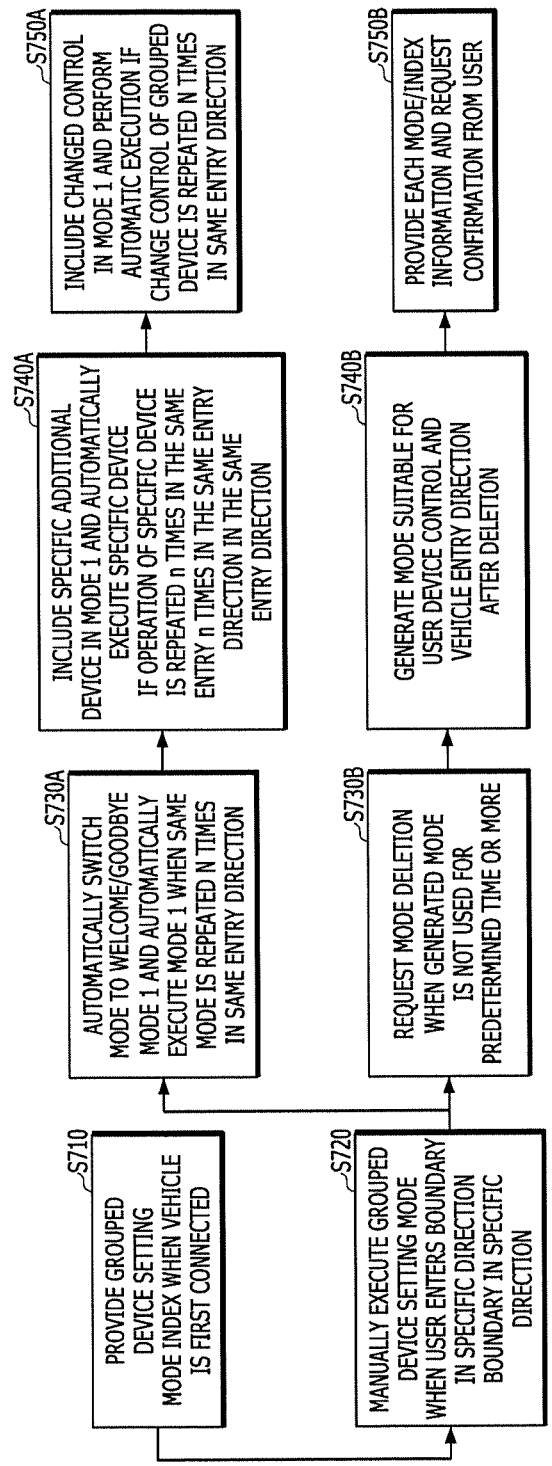
FIG. 7 is a view showing an example of mode management performed in a boundary based service provision system according to an embodiment of the present disclosure.

Next, a process of performing mode management when a specific mode is selected in a vehicle will be described with reference to FIG. 7. FIG. 7 is a view showing an example of mode management performed in a boundary based service provision system according to an embodiment of the present disclosure.

Referring to FIG. 7, the index corresponding to the (device setting) mode generated in the process described with reference to FIG. 6 may be provided to the vehicle (S710).

When the vehicle enters the boundary in a specific direction (or before or after the vehicle enters the boundary), a specific index may be manually selected according to user's desire (S720). Of course, when the user does not select the index, the index suitable for situations such as an entry direction may be automatically applied according to the existing statistics.

If the same mode is repeated by a predetermined number of times N in the same entry direction, the mode is switched to a default mode 1 of the entry direction and the default mode may be automatically performed whenever the vehicle enters in the corresponding direction (S730A). In addition, in the same direction and the same mode, if operation of a specific device (e.g., lighting device is additionally turned on) which has not been grouped in the corresponding mode is additionally repeated a predetermined number of times, control of the specific device may be automatically included in the mode 1 (S740A). In addition, in the same direction and the same mode, if operation (e.g., robot cleaner off) different from existing operation is repeatedly performed a predetermined number of times with respect to any one of devices grouped in the corresponding mode, the mode 1 may be automatically modified (changed) to perform the corresponding operation (S750A).

In contrast, a mode which is not selected by the user for a predetermined time or more when the vehicle enters the boundary in a specific direction may be deleted (S730B), a new mode may be created according to situations (S740B) after the mode is deleted, and information on the generated mode and the index may be transmitted to the vehicle again to request confirmation from the user (5750B).

The process described with reference to FIG. 7 may be performed through the device control statistic based mode setting provision system 150, as described with reference to FIGS. 5 and 6.

Next, a process of resetting a boundary will be described in detail with reference to FIG. 8. FIG. 8 is a view showing a process of resetting a boundary according to an embodiment of the present disclosure.

In FIG. 8, it is assumed that the boundary (that is, a radius-based boundary) is initially set to a radius of a predetermined distance (e.g., 1 km) from a destination (e.g., user's home). Such a radius may increase or decrease according to a time when the IoT device of the destination desires to operate in advance. For example, in FIG. 8, assume that the IoT device is turned on 2 minutes before the user arrives (that is, target ETA 2 minutes).

First, the entering vehicle analysis and automatic boundary resetting system 160 records an actual time required from a time when the vehicle enters the radius-based boundary to a time when the vehicle arrives at the destination through real-time tracking and verification (S810). In FIG. 8, the vehicle approaches the destination from the east.

When the vehicle 110 arrives at the destination, the entering vehicle analysis and automatic boundary resetting system 160 compares the estimated time of arrival (ETA) estimated when the vehicle enters the boundary with the actual time required and determines that the boundary is reset (S820) when a difference exceeds a predetermined reference value.

For example, if the ETA calculated in consideration of the actual route length (1.3 km) and the entry speed (45 kph) and the traffic condition of the route is 2 minutes, a reference (gap threshold) time for resetting the boundary is 20 seconds and the actual time required is 3 minutes, since the difference between the ETA and the actual time required is 60 seconds, which exceeds the reference time of 20 seconds, the boundary resetting procedure starts.

When boundary resetting is determined, the entering vehicle analysis and automatic boundary resetting system 160 searches the record and compares the ETA with the actual estimated time of arrival according to the remaining distance (e.g., in units of 100 m) from the boundary to the destination (S830).

For example, in FIG. 8, since the actual ETA and a target ETA (2 minutes) are closest at a point having a radius of 400 m, the east boundary may be reset to be changed from 1 km to 400 m (S840).

In the above situation, the reduced distance and the required time are somewhat proportional to each other up to the radius of 400 m, but there is another cause to make about 1 minute required between the radius of 100 m and the radius of 400 m. For example, as such a cause, an obstacle (a narrow alley, temporary road construction, a parking breaker, etc.) may be present between the radius of 100 m and the radius of 400 m when the vehicle travels in the corresponding direction or a place (a convenience store, etc.) where the user habitually comes by when the user approaches the user's home in the corresponding direction may be present.

Accordingly, as described above, when the radius is dynamically reset, the accurate operation start times of the IoT devices in the destination may be guaranteed. In other words, such a boundary resetting method is a method of setting the same ETA to the destination regardless of the direction in which the vehicle enters the boundary. The present disclosure is not limited thereto and, even if the ETAs are different in each direction, points where the ETAs to the destination are mostly uniform in each direction form the boundary. For example, if a deviation occurs due to a convenience store located at a location corresponding to a radius of 350 m, an error may occur when the user does not come by the convenience store when the boundary is set to the point corresponding to the radius of 400 m. Accordingly, since the ETA is constant from the radius of 300 m (that is, a smallest time deviation), the boundary may be reset to the point corresponding to the radius of 300 m. In this case, since the startup time of some time-sensitive IoT devices (a boiler, cooking equipment, and an air conditioner, etc.) may be insufficient until the user arrives, a larger radius may be set as a preliminary boundary and thus the time-sensitive devices may operate in advance and the other devices may operate when the vehicle passes through the boundary.

According to various embodiments of the present disclosure, it is possible to provide a boundary-based service considering a return direction.

In particular, in the present disclosure, since the boundary is reset according to the return direction, it is possible to accurately determine a service provision time.

In particular, since a traveling mode is determined in consideration of the configuration of passengers and a traveling situation, it is possible to provide safety and comfort to the passengers to be protected.

The various embodiments disclosed herein, including embodiments of the boundary based service provision system and/or elements thereof including, but not limited to, the vehicle 110, the telematics server 120, the IoT platform 130, the smart home device 140, the device control statistic based mode setting system 150 (or a mode setting device), the entering vehicle analysis and boundary resetting system 160, and the control and setting database 170, can be implemented using one or more processors coupled to a memory (or other non-transitory computer readable recording medium) storing computer-executable instructions and/or algorithm for causing the processor(s) to perform the operations and/or functions described above. The disclosure can also be embodied as computer readable code on a non-transitory, or transitory, computer readable recording medium. The computer readable recording medium is any data storage device that can store data which can be thereafter read and executed by a computer system and/or a processor to perform the above described operations and/or functions. Examples of the computer readable recording medium include hard disk drives (HDDs), solid state drives (SSDs), silicon disk drives (SDDs), read-only memories (ROMs), random-access memories (RAMs), CD-ROMs, magnetic tapes, floppy disks, and optical data storage devices.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of controlling a boundary based service provision system, the method comprising:
    setting a boundary around a destination according to a predetermined criterion, the predetermined criterion corresponding to a radius from the destination corresponding to a target estimated time of arrival;
    acquiring an entry direction of a vehicle and an estimated time of arrival (ETA) and an actual time required in the entry direction upon sensing that the vehicle passes through the boundary toward the destination;
    resetting the boundary in the entry direction when a difference between the ETA and the actual time required is equal to or greater than a predetermined value; and
    activating at least one Internet of Things (IoT) device located in the destination upon sensing that the vehicle passes through the boundary,
    wherein the activating includes grouping the at least one IoT device and executing a mode corresponding to the entry direction among at least one mode having per-grouped device control setting.

2. The method according to claim 1, wherein the resetting includes acquiring an actual time of arrival of each predetermined unit distance from the boundary to the destination.

3. The method according to claim 2,
    wherein the predetermined criterion includes a predetermined target estimated time of arrival, and
    wherein the resetting further includes resetting a point where the actual time of arrival of each predetermined unit distance is closest to the target estimated time of arrival as the boundary in the entry direction.

4. The method according to claim 2, wherein the resetting further includes resetting a point where a deviation of the actual time of arrival of each predetermined unit distance is smallest as the boundary in the entry direction.

5. The method according to claim 1, further comprising modifying or discarding the at least one mode according to command input of a user of the vehicle.

6. The method according to claim 1, wherein the at least one mode is provided to the vehicle in the form of an index and is selected by a user of the vehicle.

7. A non-transitory computer-readable recording medium having recorded thereon a program that, when executed by a computer, causes the computer to perform the method of controlling the boundary based service provision system according to claim 1.

8. A boundary based service provision system, comprising:
    a server configured to acquire at least location information of a vehicle;
    a boundary resetting device configured to acquire an entry direction of the vehicle and an estimated time of arrival (ETA) and an actual time required in the entry direction upon sensing that the vehicle passes through a boundary predetermined around a destination based on a predetermined criterion, according to information received from the server, and to reset the boundary in the entry direction when a difference between the ETA and the actual time required is equal to or greater than a predetermined value, the predetermined criterion corresponding to a radius from the destination corresponding to a target estimated time of arrival; and
    an IoT platform configured to activate at least one Internet of Things (IoT) device located at the destination upon sensing that the vehicle passes through the boundary,
    wherein the IoT platform groups the at least one IoT device and executes a mode corresponding to the entry direction among at least one mode having per-grouped-device control setting.

9. The boundary based service provision system according to claim 8, wherein the boundary resetting device acquires an actual time of arrival of each predetermined unit distance from the boundary to the destination.

10. The boundary based service provision system according to claim 9,
    wherein the predetermined criterion includes a predetermined target estimated time of arrival, and
    wherein the boundary resetting device resets a point where the actual time of arrival of each predetermined unit distance is closest to the target estimated time of arrival as the boundary in the entry direction.

11. The boundary based service provision system according to claim 9, wherein the boundary resetting device resets a point where a deviation of the actual time of arrival of each predetermined unit distance is smallest as the boundary in the entry direction.

12. The boundary based service provision system according to claim 8, further comprising a mode setting device configured to modify or discard the at least one mode according to command input of a user of the vehicle.

13. The boundary based service provision system according to claim 8, wherein the at least one mode is provided to the vehicle in the form of an index and is selected by a user of the vehicle.

* * * * *